(12) United States Patent
Burgei, Jr. et al.

(10) Patent No.: US 7,775,691 B2
(45) Date of Patent: Aug. 17, 2010

(54) RETRACTABLE LIGHT APPARATUS

(75) Inventors: James William Burgei, Jr., Mio, MI (US); Martin Barnaby, Mancelona, MI (US); Asaf Itzhak Salama, Montgomery, NY (US)

(73) Assignee: Innovative Solar Lighting LLC, Mancelona, MI (US)

( * ) Notice: Subject to any disclaimer, the term of this patent is extended or adjusted under 35 U.S.C. 154(b) by 0 days.

(21) Appl. No.: 11/836,920

(22) Filed: Aug. 10, 2007

(65) Prior Publication Data

US 2009/0040749 A1    Feb. 12, 2009

(51) Int. Cl.
*B60Q 1/06*    (2006.01)
(52) U.S. Cl. .................. 362/386; 362/269; 362/285; 362/153.1; 362/403; 52/116
(58) Field of Classification Search ......... 362/285–287, 362/269, 153.1, 418, 422–424
See application file for complete search history.

(56) References Cited

U.S. PATENT DOCUMENTS

| | | | |
|---|---|---|---|
| 2,401,390 A * | 6/1946 | Unger | 362/347 |
| 3,361,377 A | 1/1968 | Trexler, Jr. | |
| 4,180,850 A * | 12/1979 | Bivens | 362/285 |
| 4,200,904 A | 4/1980 | Doan | |
| 4,429,355 A | 1/1984 | Garchinsky | |
| 4,656,569 A | 4/1987 | Buskell | |
| 4,841,416 A | 6/1989 | Doss | |
| 4,974,134 A | 11/1990 | Bourne | |
| 4,984,139 A | 1/1991 | Goggia | |
| 5,003,441 A | 3/1991 | Crowe et al. | |
| 5,041,952 A | 8/1991 | Janda et al. | |
| 5,062,028 A | 10/1991 | Frost et al. | |
| 5,068,773 A * | 11/1991 | Toth | 362/386 |
| 5,072,345 A * | 12/1991 | Goggia | 362/153.1 |
| 5,086,267 A | 2/1992 | Janda et al. | |
| 5,124,902 A | 6/1992 | Puglisi | |
| 5,130,916 A * | 7/1992 | Toth | 362/386 |
| 5,142,463 A | 8/1992 | Panagotacos et al. | |
| 5,156,454 A | 10/1992 | White | |
| 5,221,891 A | 6/1993 | Janda et al. | |
| 5,367,442 A | 11/1994 | Frost et al. | |

(Continued)

OTHER PUBLICATIONS

International Search Report for corresponding International Application No. PCT/US08/72752, mailed Oct. 22, 2008, 8 pages.

*Primary Examiner*—Ali Alavi
(74) *Attorney, Agent, or Firm*—Brooks Kushman P.C.

(57) ABSTRACT

A retractable light is provided with a light to extend and retract in a housing. A motor for driving a sprocket is mounted in the housing or light assembly and a gear rack is mounted in the other. The gear rack has a series of apertures so that debris is conveyed into the apertures. Another embodiment provides a housing with a first guide member, connected to a light assembly by a second guide member. A motor and a gear are mounted in one of the housing and light assembly. A gear rack is mounted in the other of the housing and the light assembly. In another embodiment, a rechargeable battery is powered by a solar cell with a first circuit for powering the motor with a first voltage and a second circuit for powering the light source with a second voltage that is less than the first voltage.

20 Claims, 6 Drawing Sheets

U.S. PATENT DOCUMENTS

| | | | |
|---|---|---|---|
| 5,398,026 A * | 3/1995 | Handsaker | 340/984 |
| 5,513,085 A * | 4/1996 | Bourne | 362/286 |
| 5,628,558 A * | 5/1997 | Iacono et al. | 362/288 |
| 5,683,176 A | 11/1997 | Clendenin | |
| 6,082,877 A | 7/2000 | Hughes | |
| 6,290,377 B1 * | 9/2001 | Hulse | 362/385 |
| 6,491,407 B1 | 12/2002 | Beadle | |
| 7,021,787 B1 | 4/2006 | Kuelbs | |
| 7,080,816 B1 * | 7/2006 | Vaccaro | 248/545 |
| 7,476,006 B2 * | 1/2009 | Hinds | 362/286 |
| 7,531,972 B1 * | 5/2009 | Worsham et al. | 318/16 |
| 2006/0002122 A1 | 1/2006 | Griffin | |

* cited by examiner

RETRACTABLE LIGHT APPARATUS

BACKGROUND OF THE INVENTION

1. Field of the Invention

The invention relates to retractable light apparatuses.

2. Background Art

Various retractable light apparatuses are disclosed in the art including light fixtures that are mounted aboveground and retractable light fixtures that are stowed below ground. Retractable light apparatuses offered by the prior art include lead screw mechanisms, and others include rack and pinion mechanisms. Some mechanisms include springs or coils for providing a lift and/or lower function.

SUMMARY OF THE INVENTION

One embodiment of the invention provides a retractable light apparatus with a housing and a light assembly operably connected to the housing to extend and retract relative to the housing. A motor is mounted in one of the housing and the light assembly to drive a sprocket gear. A gear rack is mounted in the other of the housing and the light assembly in engagement with the sprocket gear so that as the motor drives the sprocket gear, the light assembly is translated relative to the housing. The gear rack has a series of apertures so that debris that contaminates the engagement of the sprocket gear and the gear rack is conveyed into the apertures.

Another embodiment discloses a retractable light apparatus having a housing with a first guide member mounted in the housing. A second guide member is operably connected to the first guide member for translation relative thereto. A light assembly is mounted to the second guide member to extend and retract relative to the housing as a second guide member translates relative to the first guide member. A motor is mounted in one of the housing and the light assembly and a gear is driven by the motor. A gear rack is mounted in the other of the housing and the light assembly in engagement with the gear so that as the motor drives the gear, the light assembly is translated relative to the housing.

Another embodiment of the invention discloses a retractable light apparatus with a housing, a light assembly including at least one light-emitting diode (LED) and operably connected to the housing to extend and retract. A motor is mounted in one of the housing and the light assembly and a gear is driven by the motor. A gear rack is mounted in the other of the housing and the light assembly in engagement with the gear so that as the motor drives the gear, the light assembly is translated relative to the housing. A rechargeable battery is mounted in one of the housing and the light assembly. A solar cell is oriented on top of the light assembly for collecting solar power and the solar cell is in communication with the battery for recharging the battery. A first circuit selectively powers the motor with a first voltage from the rechargeable battery, and a second circuit selectively powers the LED with a second voltage from the rechargeable battery that is less than the first voltage.

The above embodiments, and other embodiments, aspects, objects, features, advantages, and benefits of the present invention are readily apparent from the detailed description of embodiments of the present invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
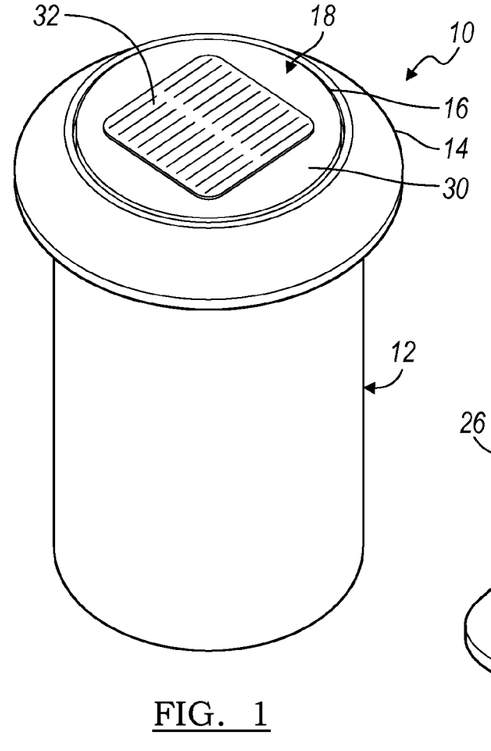
FIG. 1 is a perspective view of an embodiment of a retractable light apparatus in accordance with the present invention, illustrated in a retracted position.
Figure 2:
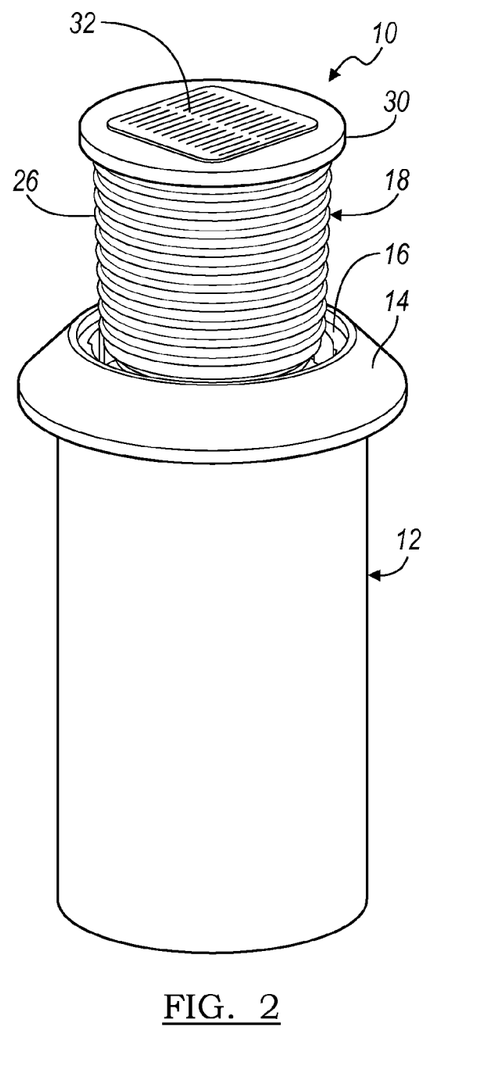
FIG. 2 is a perspective view of the retractable light apparatus of FIG. 1, illustrated in an extended position.

With reference now to FIG. 1, an embodiment of a retractable light apparatus is illustrated in accordance with the present invention and is referenced generally by numeral 10. The retractable light apparatus 10 includes a housing 12 that is sized to be embedded within the ground such that a top of the housing 12 sits adjacent to a top surface of the ground and is exposed. The housing 12 of the embodiment illustrated includes a flange 14 extending outboard from the housing 12 for resting upon the ground and for preventing a top of the housing 12 from being forced beneath a top surface of the ground in an inadvertent occurrence whereby someone may step upon the light apparatus 10. The housing 12 includes an opening 16 for receiving a light assembly 18. The light assembly 18 is illustrated retracted relative to the housing 12 in FIG. 1. The light assembly 18 operates with the housing 12 to extend as illustrated in FIG. 2 for illuminating a localized region of a corresponding garden, sidewalk, thoroughfare, or any outdoor or indoor region that may utilize retractable lighting.

The prior art has provided outdoor lighting with light fixtures that are mounted aboveground. Since such light fixtures are viewable during daylight, it is desired to recess the light fixtures so that they are only revealed during the nighttime. Accordingly, the prior art has provided retractable light fixtures. The prior art retractable light fixtures typically utilize inefficient mechanisms that require hard wiring of a power source. Other prior art retractable light assemblies employ mechanisms that are inefficient such that utilization of a rechargeable battery source and solar power are inadequate for lighting the associated region for extended periods of time, such as eight hours, to power the light through the night.

For example, one such prior art inefficient mechanism utilizes a spring or coil for extending and/or retracting the light assembly. Such mechanisms are inefficient because spring assemblies fatigue as a function of repeated operations and eventually require replacement. Another such inefficient design utilizes a lead screw or a rack and pinion. These mechanisms are inefficient because in the environment of retractable lighting, these mechanisms become exposed to debris such as sand or soil that causes the mechanism to become inefficient by resisting the drive of the mechanism and/or damaging the drive of the mechanism until failure.

Another example of inefficient prior art mechanisms for retractable light apparatuses is wherein the drive mechanism is displaced laterally outboard within the housing thereby providing instability in the drive mechanism resulting in friction and/or binding that opposes the raising or lowering of the light assembly.

The retractable light apparatus 10 provides a design that is adequately efficient to drive the light assembly 18 to and from the retracted and extended positions of FIGS. 1 and 2, illuminate a surrounding region, and optionally utilize solar power in a rechargeable battery in order to avoid the costs, installation, hardware, and maintenance associated with hard wiring the power source.

Figure 3:
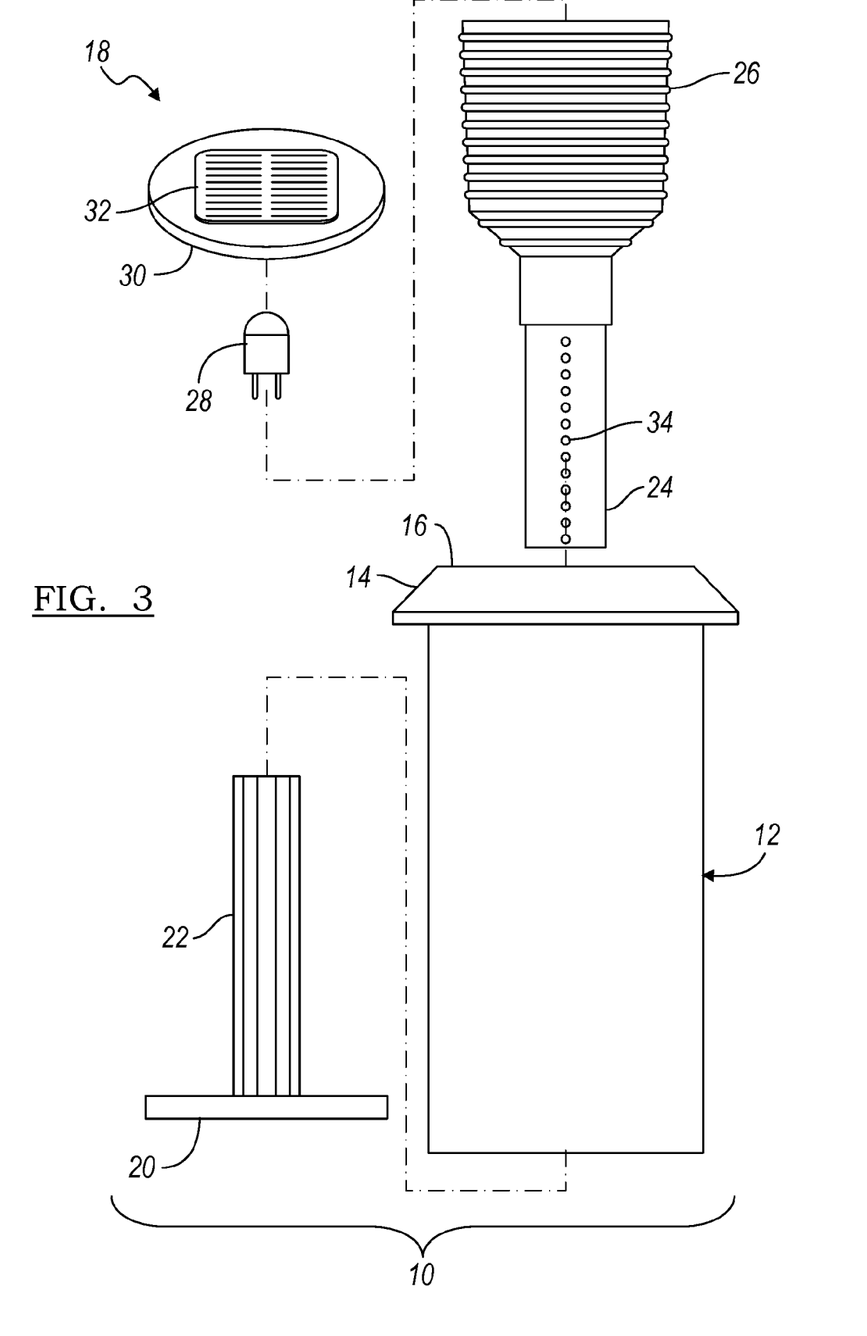
FIG. 3 is a partial exploded view of the retractable light apparatus of FIG. 1.

FIG. 3 illustrates the light apparatus 10 partially exploded for revealing components within the housing 12. The housing 12 has a length sufficient to extend beneath a frost line such that the apparatus 10 is not uprooted from the ground during frost conditions. Since the frost line depth varies by climate and geography, the invention contemplates that the housing 12 has a depth to accommodate all frost line requirements for a particular geographical region in which the apparatus 10 is provided.

The housing 12 is illustrated with a bottom plate 20 that is mounted in the bottom of the housing 12. The bottom plate 20 may be formed integrally with the housing 12, such as during a molding operation. Alternatively, the bottom plate 20 may be formed separately and may be subsequently affixed to the housing 12. In order to keep the housing 12 watertight, the bottom plate 20 may be friction welded or hot plate welded to the housing 12. A guide shaft 22 is mounted to the bottom plate 20 for guiding the light assembly 18.

The light assembly 18 includes a guide sleeve 24 that is inserted into the opening 16 of the housing 12 and disposed over the guide shaft 22 such that the light assembly 18 is guided along the guide shaft 22 as the light assembly 18 is extended and retracted. The light assembly 18 also includes a translucent housing portion 26, which retains and houses a light source and permits the light source to illuminate through the housing portion 26 as a lens or window. The lens 26 may extend partially or entirely around a perimeter of the light assembly 18 for providing partial or omnidirectional lighting of the surrounding region. In one embodiment, a light-emitting diode (LED) 28 is mounted within the lens 26 for providing the source of illumination.

The light assembly 18 also includes a cap 30 that is mounted upon the lens 26 for concealing the light source 28. The cap 30 is also sized to engage the opening 16 of the housing 12 for providing a watertight seal to the housing 12 in the retracted orientation of the light assembly 18. For example, an elastomeric seal such as an O-ring or a gasket may be provided on the underside of the cap 30 for engaging the opening 16 of the housing 12 for providing the watertight seal.

In at least one embodiment, a solar cell 32 is mounted upon the cap 30 for receiving solar energy when exposed to an external light source, such as the sun. The solar cell 32 cooperates with the light apparatus 10 for indicating when it is nighttime to drive the light assembly 18 to extend and illuminate the surrounding environment. The solar cell 32 is also utilised for collecting solar energy and storing the solar energy for powering the light apparatus 10.

Figure 4:
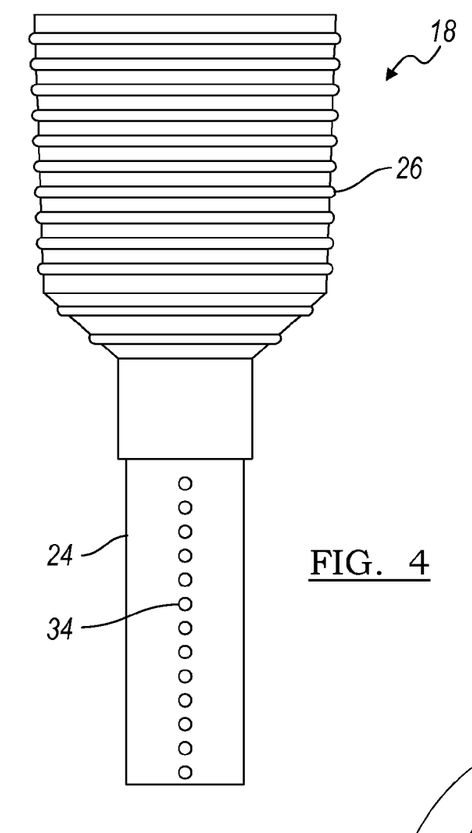
FIG. 4 is a side elevation view of the light assembly of the retractable light apparatus of FIG. 1.

FIG. 4 illustrates the light assembly 18 enlarged. The guide sleeve 24 includes a series of incrementally spaced apertures 34 formed through the sidewall of the sleeve 24 for cooperating with an associated drive mechanism.

Figure 5:
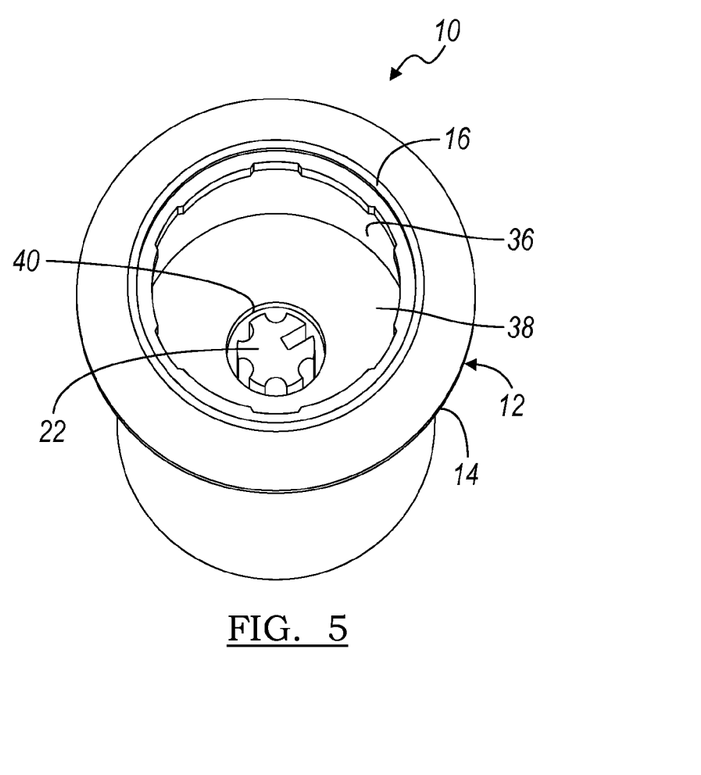
FIG. 5 is a top perspective view of the retractable light apparatus of FIG. 1, illustrated with the light assembly removed.

Referring now to FIG. 5, the housing 12 includes a cavity 36 that is exposed by the opening 16 with the light assembly 18 removed. An annular separation plate 38 is mounted in the cavity 36 separating the cavity 36 between an upper region and a lower region. The upper region of the cavity 36 is illustrated in FIG. 5 for receiving and retaining the light assembly 18 in a retracted orientation of the light assembly 18. The separation plate 38 includes an aperture 40 formed through the plate 38, revealing the guide shaft 22. Thus, the guide sleeve 24 of the light assembly 18 extends through the opening 16 of the housing 12, through the aperture 40 of the separation plate 38, and about the guide shaft 22.

Figure 6:
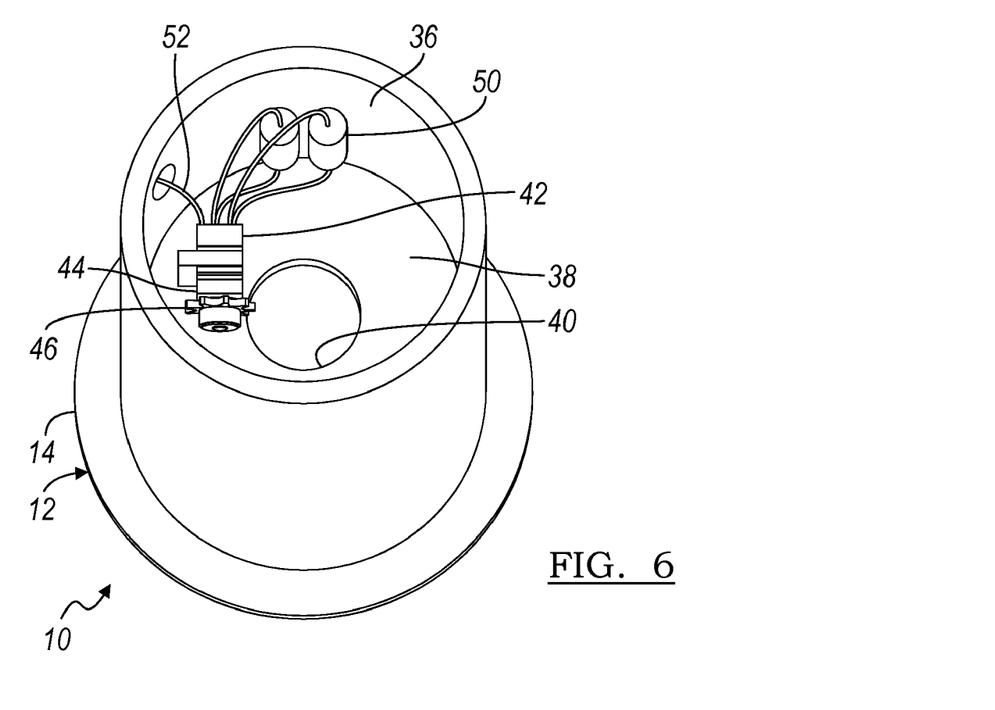
FIG. 6 is a bottom perspective view of the retractable light apparatus of FIG. 1, illustrated partially disassembled.

FIG. 6 illustrates the underside of the housing 12, with the bottom plate 20 removed for revealing the lower region of the cavity 36 beneath the separation plate 38. A motor 42 is mounted within the housing 12 beneath the separation plate 38. The motor 42 is a direct current motor and may include an optional gearbox 44 for reducing the output rotation and for increasing the output torque of the motor 42. Although a direct current motor is described for the illustrated embodiment, the invention contemplates that the motor 42 may be any suitable motor, such as an alternating current motor, within the spirit and scope of the present invention. The motor 42 drives a sprocket gear 46 that is aligned adjacent the aperture 40 and the separation plate 38. The sprocket 46 is provided in engagement with the series of apertures 34 in the guide sleeve 24 such that the sprocket 46 and guide sleeve 24 cooperate as a rack and pinion respectively. Thus, the series of apertures 34 provide a gear rack that is driven by the sprocket 46 for driving the guide sleeve 24 along the guide shaft 22.

The sprocket gear 46 in cooperation with the apertures 34 is less susceptible to damage by debris in comparison to prior art rack and pinion mechanisms. Debris that may enter into the housing 12 and contaminate the engagement of the sprocket 46 with the apertures 34 is forced through the apertures 34 thereby preventing an interference between the sprocket 46 and the gear rack provided by the guide sleeve 24. Thus the sprocket 46 and guide sleeve aperture 34 combination minimizes damage and maintains efficiency in comparison to prior art gear rack mechanisms. Additionally, by utilizing the gear sprocket 46 and the apertures 34, wider manufacturing tolerances are permitted in comparison to conventional spur gear pinions and spur gear racks.

Figure 7:
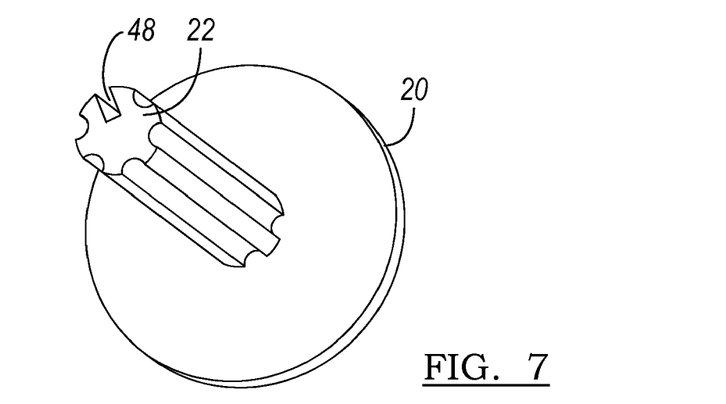
FIG. 7 is a top perspective view of the guide member of the retractable light apparatus of FIG. 1.

Referring to FIG. 7, a slot 48 is formed in the shaft 22, which is aligned with the sprocket 46 to provide clearance for the gear teeth of the sprocket 46 that extend through the apertures 34 and the guide sleeve 24. Additionally, the slot permits the debris to drop from and clear the engagement of the sprocket 46 and the apertures 34.

Referring now to FIGS. 4-6, the drive mechanism provided by the guide sleeve 24 and the sprocket 46, as well as the guide mechanism provided by the guide shaft 22 and guide sleeve 24 are oriented generally centrally within the housing 12. This orientation minimizes friction and binding associated with prior art mechanisms that dispose the driving mechanism at a laterally outboard orientation within the housing 12.

Thus, inefficiencies such as friction and binding are eliminated or minimized due to the central orientation of the driving mechanism and guide.

Referring again to FIG. 6, a rechargeable power source is provided within the housing 12 by a series of rechargeable batteries 50 that are mounted in the housing 12 beneath the separation plate 38. The batteries 50 are wired to the motor 42, light assembly 18 and solar cell 32. In operation of the light apparatus 10, the solar cell 32 collects solar power, which is stored in the rechargeable batteries 50. In absence of external light, the batteries 50 drive the motor 42 thereby extending the light assembly 18 to the extended position illustrated in FIG. 2.

The static friction provided by the gear box 44 is adequate to maintain the light assembly 18 in the extended position, without requiring continual operation of a drive mechanism, such as some prior art mechanisms. Likewise, the gear box 44 lacks a locking mechanism. Thus, if a load is inadvertently applied to the cap 32, such as someone stepping upon the cap 32, the light assembly 18 is retracted instead of resisting the load and resulting in damage.

Once the light assembly 18 is deployed, the batteries 50 are utilized for lighting the light source 28. Upon receipt of solar power at the solar cell 32, which indicates that an external light source is available, the motor 42 is driven in a reverse direction thereby retracting the light assembly 18 to the closed orientation of FIG. 1.

By utilizing an LED or a series of LEDs as the light source 28, efficient use of the stored energy is provided in comparison to prior art retractable lights that utilize an incandescent bulb that waste a comparatively large amount of stored energy has heat. Thus, the stored energy is efficiently used thereby prolonging the period for which the light assembly 18 illuminates the associated region.

Since the LEDs 28 require less voltage than the motor 42, the rechargeable batteries 50 may provide one voltage for the driving mechanism and a smaller voltage for the illumination. For example, the rechargeable batteries 50 may provide six volts to the motor 42 in one embodiment for driving the light assembly 18 between the retracted and extended positions, and the rechargeable batteries 50 may provide three volts to the light source 28 for extended illumination of the associated region. Thus, the light apparatus 10 includes two separate circuits for driving the light assembly 18 and illuminating the light assembly 18.

Alternatively, instead of utilizing batteries 50, the light apparatus 10 may include wiring 52 that extends through the housing 12 and is connected to an alternate power source, such as a direct current power source, such as a transformer or other power supply. In another embodiment, the motor 42 is an alternating current motor 42 and the wiring 52 is connected to an alternating current power source. The invention contemplates incorporation of any suitable power source within the spirit and scope of the present invention.

Figure 8:
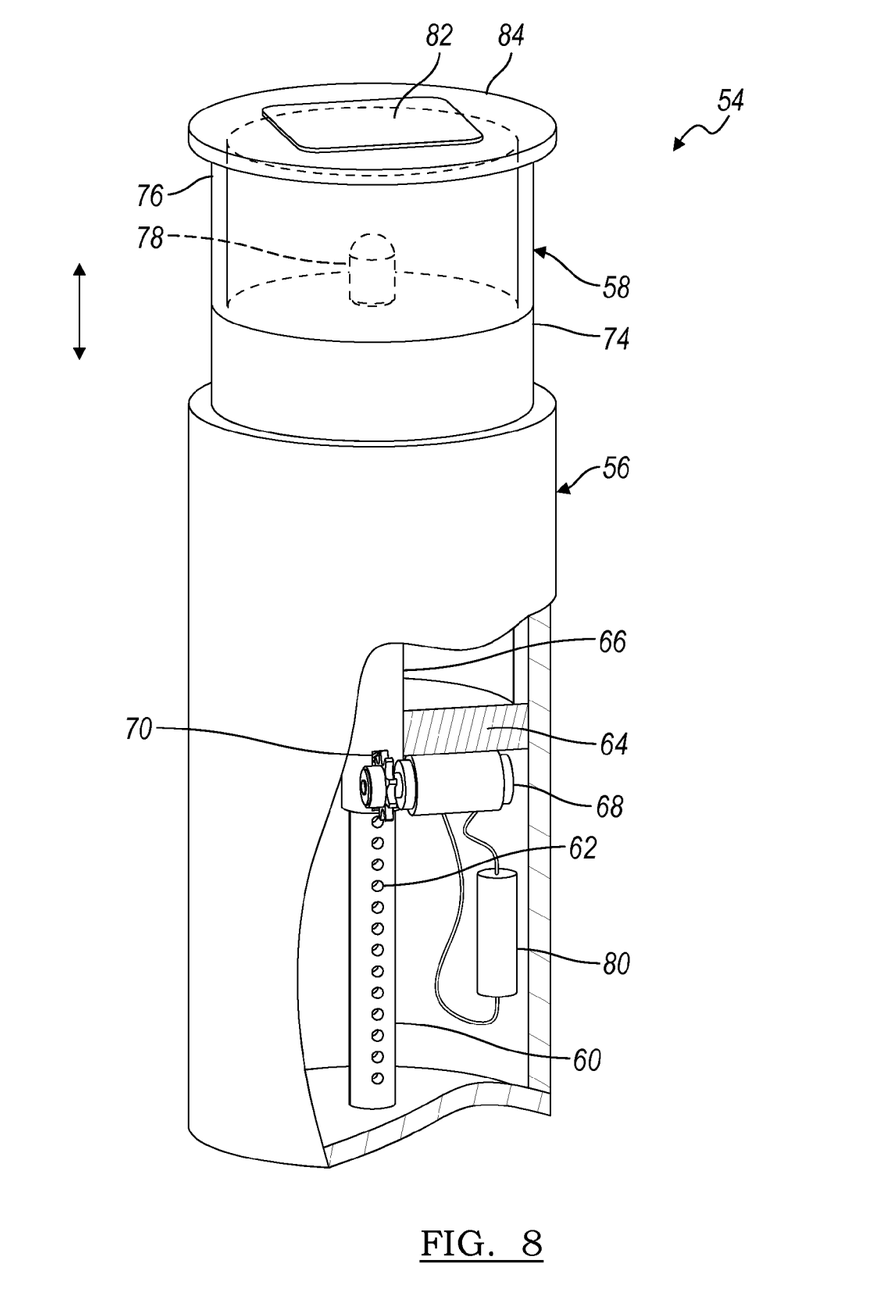
FIG. 8 is a side, fragmentary perspective view of another retractable light apparatus embodiment in accordance with the present invention.
Figure 9:
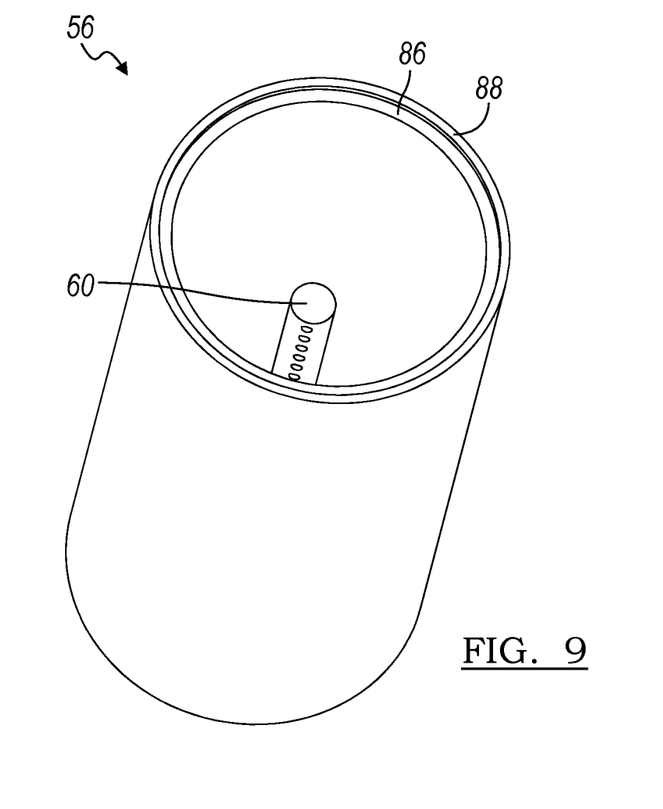
FIG. 9 is a perspective view of a part of the retractable light apparatus of FIG. 8.

Referring now to FIG. 8, another retractable light apparatus embodiment is illustrated in accordance with the present invention. The light apparatus 54 includes a housing 56 that is sized to receive and retain a light assembly 58. Referring to FIG. 9, the housing 56 includes a central guide shaft 60 mounted to a bottom of the housing 56.

Figure 10:
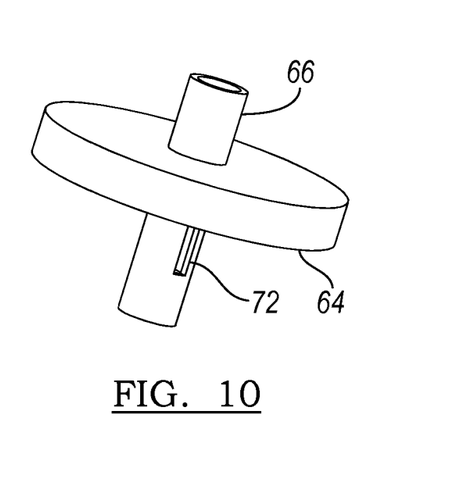
FIG. 10 is a perspective view of another part of the retractable light apparatus of FIG. 8.

In FIG. 8, the guide shaft 58 is illustrated as having a series of apertures 62 formed therein for providing a gear rack for an associated driving mechanism. The light assembly 58 includes a bottom plate 64 with a central sleeve 66 formed therethrough. The sleeve 66 is disposed about the guide shaft 60. A motor and gear box assembly 68 are mounted to the bottom plate 64 for driving a sprocket 70. In at least one embodiment of the invention, the motor of the assembly 68 is a direct current motor. FIG. 10 illustrates the bottom plate 64 and sleeve 66 enlarged and disassembled from the light assembly 58. A slot 72 is formed through the sleeve 66 so that the sprocket 70 can extend through the slot 72 and engage the aperture 62 of the guide shaft 60.

With reference again to FIG. 8, the light assembly 58 includes an upper housing portion 74 that is mounted upon a top surface of the bottom plate 64. The upper housing portion 74 includes a translucent window 76 so that illumination provided by a light source 78 within the window 76 is conveyed to a corresponding region of the light apparatus 54. The motor 68 and light source 78 may be wired to a rechargeable battery 80 that is powered by a solar cell 82 mounted to a cap 84 of the light assembly 58. Alternatively, the light source 78 and motor 68 may be wired to an external power source. When the light assembly 58 is retracted from the position illustrated in FIG. 8, the solar cell 82 senses an external existence of solar power and sends a signal that drives the motor 68. The motor and gearbox assembly 68 drives the sprocket 70 thereby driving the light assembly 58, the motor 68 and the sprocket 70 down the shaft 60.

Referring again to FIG. 9, the housing 56 includes a land 86 formed adjacent to an opening 88 of the housing 56. The landing 86 receives the cap 84 of the light assembly 58 for providing a watertight seal when closed.

Referring again to FIG. 8, the upper housing portion 74 and window 76 of the light assembly 58 have a continuous lengthwise profile that is sized relative to the opening 88 to minimize clearance between the light assembly 58 and the housing 56. By providing a continual lengthwise profile that minimizes the clearance, contamination of the light apparatus 54 by debris is minimized thereby prolonging the operability of the light apparatus 54.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retractable light apparatus comprising:
    a housing;
    a light assembly operably connected to the housing to extend and retract relative to the housing;
    a motor mounted in the housing;
    a sprocket gear operably driven by the motor; and
    a gear rack mounted in the light assembly in engagement with the sprocket gear so that as the motor drives the sprocket gear, the light assembly is translated relative to the housing, the gear rack having a series of apertures formed therein so that debris that contaminates the engagement of the sprocket gear and the gear rack is conveyed into the apertures.

2. The retractable light apparatus of claim 1 wherein the series of apertures are formed through the gear rack.

3. The retractable light apparatus of claim 1 further comprising:
    a rechargeable battery oriented in one of the housing and the light assembly; and
    a solar cell oriented on top of the light assembly for collecting solar power, the solar cell being in communication with the battery for recharging the battery.

4. The retractable light apparatus of claim 1 wherein the light assembly further comprises at least one light-emitting diode.

5. The retractable light apparatus of claim 1 wherein the housing has an opening and the light assembly extends from and retracts into the housing opening.

6. The retractable light apparatus of claim 5 wherein the light assembly has a lengthwise profile sized to minimize clearance between the light assembly and the housing opening to minimize contaminants within the housing.

7. The retractable light apparatus of claim 5 wherein the light assembly further comprises a cap for enclosing the housing opening.

8. The retractable light apparatus of claim 1 further comprising:
   a first guide member mounted in the housing; and
   a second guide member mounted to the light assembly and operably connected to the first guide member for translation relative to the first guide member.

9. The retractable light apparatus of claim 8 wherein the first and second guide members are oriented centrally within the housing and the light assembly.

10. The retractable light apparatus of claim 8 wherein the series of apertures are formed through the second guide member, wherein the motor is mounted in the housing and the sprocket gear is engaged with the second guide member.

11. The retractable light apparatus of claim 8 wherein the first guide member further comprises a shaft mounted in the housing, and wherein the second guide member further comprises a sleeve mounted to the light assembly and disposed over the shaft.

12. The retractable light apparatus of claim 11 wherein the apertures are formed through the sleeve and the shaft includes a slot so that teeth of the sprocket gear extend through the sleeve and into the slot in the shaft.

13. The retractable light apparatus of claim 12 wherein the motor is mounted in the housing.

14. The retractable light apparatus of claim 11 wherein the apertures are formed in the shaft and the sleeve includes a slot so that the teeth of the sprocket gear extend through the slot and into the apertures in the shaft.

15. The retractable light apparatus of claim 14 wherein the motor is mounted to the light assembly to extend and retract with the light assembly.

16. The retractable light apparatus of claim 1 further comprising a gear box driven by the motor and connected to the sprocket gear for reducing the output rotation and for increasing the output torque from the motor to the sprocket gear, wherein the static friction provided by the gear box is adequate to maintain the light assembly in the extended position without continual operation of a drive mechanism and without a locking mechanism.

17. The retractable light apparatus of claim 1 further comprising a separation plate oriented in the housing for separating the light assembly and the motor.

18. The retractable light apparatus of claim 1 wherein the light assembly further comprises at least one light-emitting diode (LED); and
   wherein the retractable light apparatus further comprises:
      a rechargeable battery oriented in one of the housing and the light assembly,
      a solar cell oriented on top of the light assembly for collecting solar power, the solar cell being in communication with the battery for recharging the battery,
      a first circuit for selectively powering the motor with a first voltage from the rechargeable battery, and
      a second circuit for selectively powering the at least one LED with a second voltage from the rechargeable battery that is less than the first voltage.

19. A retractable light apparatus comprising:
   a housing;
   a first guide member mounted in the housing;
   a second guide member operably connected to the first guide member for translation relative to the first guide member;
   a light assembly mounted to the second guide member to extend and retract relative to the housing as the second guide member translates relative to the first guide member;
   a motor mounted in one of the housing and the light assembly;
   a gear operably driven by the motor; and
   a gear rack mounted in the other of the housing and the light assembly in engagement with the gear so that as the motor drives the gear, the light assembly is translated relative to the housing;
   wherein the first guide member further comprises a shaft mounted in the housing, and wherein the second guide member further comprises a sleeve mounted to the light assembly and disposed over the shaft; and
   wherein the motor is mounted in the light assembly, the gear rack is provided on the shaft, and the sleeve includes a slot so that the gear extends through the slot and into engagement with the gear rack.

20. A retractable light apparatus comprising:
   a housing;
   a light assembly operably connected to the housing to extend and retract relative to the housing, the light assembly including at least one light-emitting diode (LED);
   a motor mounted in one of the housing and the light assembly;
   a gear operably driven by the motor;
   a gear rack mounted in the other of the housing and the light assembly in engagement with the gear so that as the motor drives the gear, the light assembly is translated relative to the housing;
   a rechargeable battery oriented in one of the housing and the light assembly;
   a solar cell oriented on top of the light assembly for collecting solar power, the solar cell being in communication with the battery for recharging the battery;
   a first circuit for selectively powering the motor with a first voltage from the rechargeable battery; and
   a second circuit for selectively powering the at least one LED with a second voltage from the rechargeable battery that is less than the first voltage.

* * * * *